United States Patent [19]
Nicholson, Jr.

[11] 3,945,925
[45] Mar. 23, 1976

[54] FILTER DEVICE

[75] Inventor: Charles B. Nicholson, Jr., Glens Falls, N.Y.

[73] Assignee: Albany Engineered Systems, Glens Falls, N.Y.

[22] Filed: Apr. 15, 1974

[21] Appl. No.: 460,882

[52] U.S. Cl. ................ 210/435; 210/447; 210/448; 210/455; 210/497 R
[51] Int. Cl.² .......................................... B01D 27/00
[58] Field of Search ........... 210/411, 435, 438, 439, 210/446–448, 452, 483, 497, 455

[56] References Cited
UNITED STATES PATENTS

| | | | |
|---|---|---|---|
| 1,638,066 | 8/1927 | Smythe | 210/438 |
| 1,706,400 | 3/1929 | Diamond | 210/497 X |
| 3,193,100 | 7/1965 | Broughton | 210/411 X |
| 3,240,347 | 3/1966 | Zievers et al. | 210/438 X |
| 3,633,753 | 1/1972 | Petitjean | 210/497 X |

Primary Examiner—Charles N. Hart
Assistant Examiner—Richard W. Burks
Attorney, Agent, or Firm—James R. Cwayna

[57] ABSTRACT

A filter device particularly directed to the straining of materials for coating paper products which device is provided with a tapered baffle element to particularly aid in the back flushing of the filter to provide cleaning thereof and said baffle having a plurality of arcuately spaced fin members thereon for supporting of a filter element thereabout. This filter element is formed of a replaceable material having a plurality of apertures therethrough which material is normally non self supporting and which material gains its filtering support and positioning by the finned structure which will support the filtering element in both the normal filter operation and the back wash operation.

4 Claims, 6 Drawing Figures

FILTER DEVICE

Applicant is providing herein a filter device particularly directed to the straining and filtering of material utilized in coating of paper products or which may be likewise utilized in the filtering of other fluids in the paper making industry. In the coating of paper products, the sizing of material is of particular importance and the unit provided herein not only provides such control, but also provides a unit which allows for selective backwash of individual filter units arranged in a filter system.

With applicant's device, the unit includes a housing with the filter device removably insertable therein, which filter device provides a tapered baffled member generally centrally thereof, such that upon back wash of the filter device, a substantially constant pressure will be maintained along the longitudinal demension of the unit.

With applicant's device, a replaceable filter element is provided in spaced relationship to a tapered baffle member and is held in such position by a plurality of arcuately spaced fins such that the filter element which may be normally of flexible material will be positively held in proper filtering postion.

It is therefore an object of applicant's invention to provide a filter device for use within a filter housing which filter device incorporates a tapered baffle member to substantially insure continuity of fluid pressure along the entire length thereof for back washing a filter element surrounding the baffle.

It is a further object of applicant's invention to provide a filter device which incorporates a filter unit arranged within a filter housing which filter unit includes a generally longitudinally tapering baffle member, a plurality of radially extending fins arranged on the baffle member and a filter element arranged about the extending ends of said fins, for positioning of the same therearound and for support by the fins.

It is still a further object of applicant's invention to provide a filter device which includes a normally non self supporting filter element with means for supporting the filter element in spaced relation about a generally tapered baffle member by providing a plurality of radially extending fins on the baffle member which fins will provide a plurality of tapered filter compartments defined between adjacent fins, the baffle and the filter element.

It is still a further object of applicant's invention to provide a filter device removably inserted into a filter housing which filter device provides means for supporting a normally non self supporting filter element and supporting such filter element without regard to the direction of fluid flow therethrough.

These and other objects and advantages of the invention will more fully appear from the following description made in connection with the accompanying drawings in which the same numeral is used to designate the same or similar parts throughout the several views, and in which.

Figure 1:
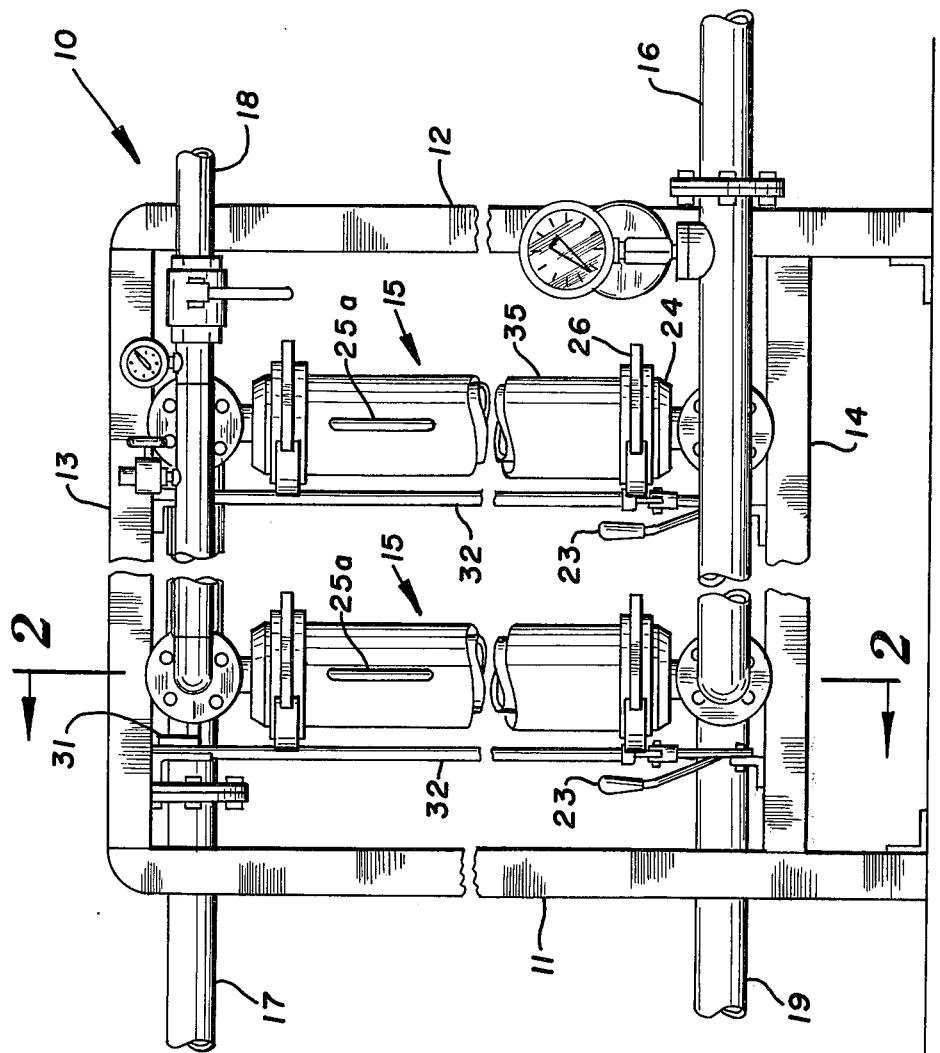
FIG. 1 is a front elevation of a filter unit embodying the concepts of applicant's invention and illustrating the same mounted on a typical framework installation disclosing a plurality of such filter devices.

In accordance with the accompanying drawings a coating strainer unit which is typical of an installation embodying the concepts of applicant's invention is illustrated in FIG. 1 and is designated in its entirety by the numeral 10. A typical installation includes a support frame structure, having at least upright members 11, 12 and an upper cross member 13. In addition to these members other members such as a lower support member 14 may be provided as called for by the individual installation.

The individual number of filter units will again depend upon the particular application and in the form shown, two filter units 15 are provided. In any installation the units are provided and connected for separate or composite operation but in each installation a plurality of manifolds are provided. The manifolds include an inlet manifold 17 to deliver the properly filtered fluid to the coating device a back wash inlet 18 and a drain manifold 19. This number of manifolds is provided to provide not only a filtering operation but to also provide a backwash system for selected and periodic cleaning of the filters. As will be shown hereinafter the arrangement utilized permits cleaning of any selected filter without requiring that the entire operation be shut down.

The lower, inlet manifold 16 and drain manifold are respectively connected to the lower end of the filter through a valve member 20 which valve member 20 is provided with a rotatable control member 21 having an L-shaped control passage formed therein, which passage is designated 22. The L-shaped passage permits selected communication between either of the manifolds 16–19 and the interior of the filter 15. A control arm 23 extends outwardly from the valve member 21 to permit control of the rotatable member 21.

The filter member 15, in the from shown, includes a base plate 24 sealingly connected to the upper surface of the valve member 20 which plate is provided with a radially extending locating and locking flange 24a thereon such that a filter housing 25 may be positioned thereon and clamped thereto with a circumferential clamp device 26. The filter housing 25 extends upwardly to an upper clamping arrangement consisting of an upper plate 27 secured to an upper valve member 28 with again a circumferential sealing and clamping device 29 provided for proper locking of the upper end of the filter housing 25 in fluid flow position.

The upper valve member 28 again includes a rotatable control member 30 having an L-shaped passage therethrough to permit selective flow connection to either the outlet manifold 17 or the backwash inlet 18.

As with the lower valve member 20 the upper valve member 28 is provided with an outwardly extending operating handle 31 to control the position of the control portion 30 thereof. In the form shown a common link member 32 may be utilized to provide simultaneous shifting of the upper 28 and lower 20 valve members so they will both be in proper position for either the filter or the back wash cycle. With this common link structure it should be obvious that with the the inclusion of an actuating cylinder (not shown) to control this common link 32 the unit may be automatically and remotely controlled. The operational statement following will show the operations of both an automated arrangement and a simplified version wherein the link is omitted.

It should be obvious thus far that with the manifolds and connected valves properly mounted on the frame structure that it is possible to remove the filter housings 25 from their illustrated positions by removing the circumferential clamp members 26, 29 and shifting the housings 25 with the provided handles 25a.

The important consideration of this entire unit lies in the actual filter element designated generally 35 which filter element is arranged within the filter housing 25 and extends longitudinally therein. The actual construction of the filter element 35 is best illustrated in the views 3, 4, 5, and 6.

Figure 6:
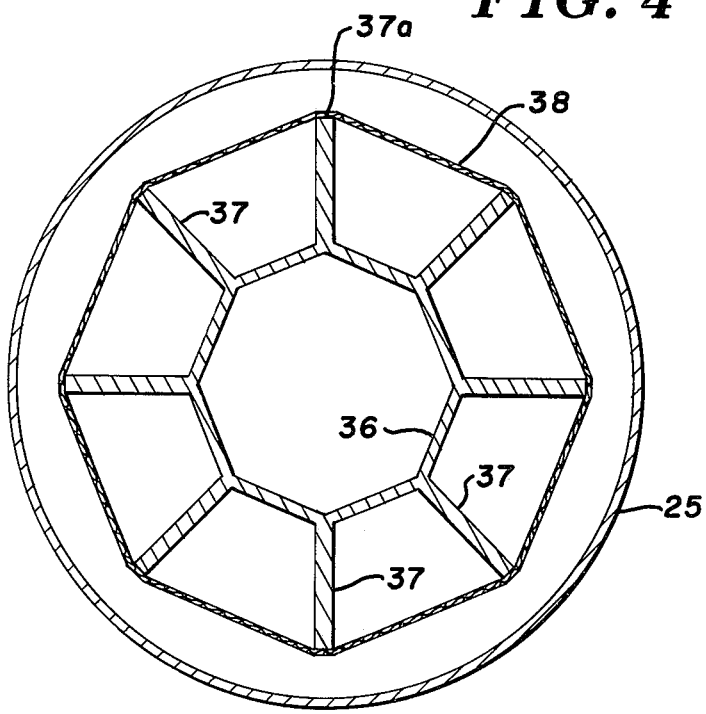

As particularly illustrated in these views, the filter element 35 consists of a first baffle member 36 which is frusto-conical in shape having a closed bottom portion 36a, with a downwardly depending flange 36b thereon, and a closed upper portion 36c, having an attachment bolt or the like 36d secured thereto and extending upwardly therefrom. A plurality of vane members 37 are arranged in arcuately spaced relation about the baffle sides and extend longitudinally therealong and again are tapered such that the exterior edges 37a thereof will be in substantially parallel relation. The radial dimension across the entire width of the vanes 37 is, as illustrated in FIG. 6, slightly less than the diameter of the housing member 25 such that fluid may flow therearound. As also illustrated in FIG. 6 the interior baffle member 36 may take a multisided configuration such as an octagon or the like or may be generally circular in configuration. The concept of the vanes 37 is to provide exterior supporting portions for the normally non self supporting filter element 38 placed therearound.

The upper 37b and lower 37c edges of the vanes 37 are reduced in diameter such that a retainer ring 39 may be fit thereabout to entrap and hold the filter element 38 thereon.

As illustrated in these four views, this construction, when the filter element 38 is placed around the periphery of the vanes 37 will form a unit providing filter areas defined by the baffle member 36, a pair of spaced vanes 37 and the filter element 38. This filter compartment will be open at the upper surface thereof to permit normal passage of water into or out of the housing 25 and into or out of the upper valve member 30.

The filter element 38 is made of a material which is normally flexible such as cloth, plastic materials, or the like and which, due to its normal flexibility, requires support against water pressure for proper filtering of materials passing therethrough. This support is provided by the vanes 37 and these vanes will hold this material in chord-like fashion about the tips 37a thereof whether the unit is being operated as a filter or whether the unit is being back washed.

In the normal filtering condition, water will enter the inlet 16 and will enter the area normally surrounding the filter material between itself and the housing 25, pass therethrough into the compartmented areas and will exit upwardly through the upper valve member into outlet 17. When the unit is operated in a back wash condition the valves 20 and 28 will be reversed and back wash fluid will be directed into the unit through a backwash inlet 18 and will pass through the filter washing the material from the exterior of the filter media 38 into the drain outlet 19.

Figure 2:
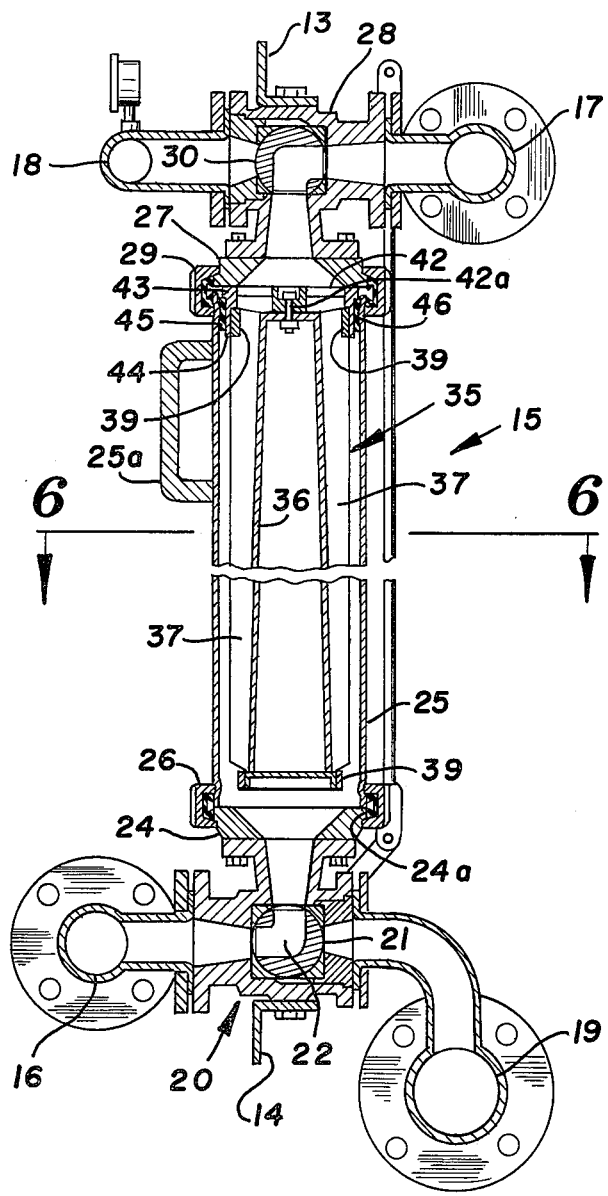
FIG. 2 is a vertical section taken substantially along line 2 of FIG. 1.
Figures 3, 4, 5:
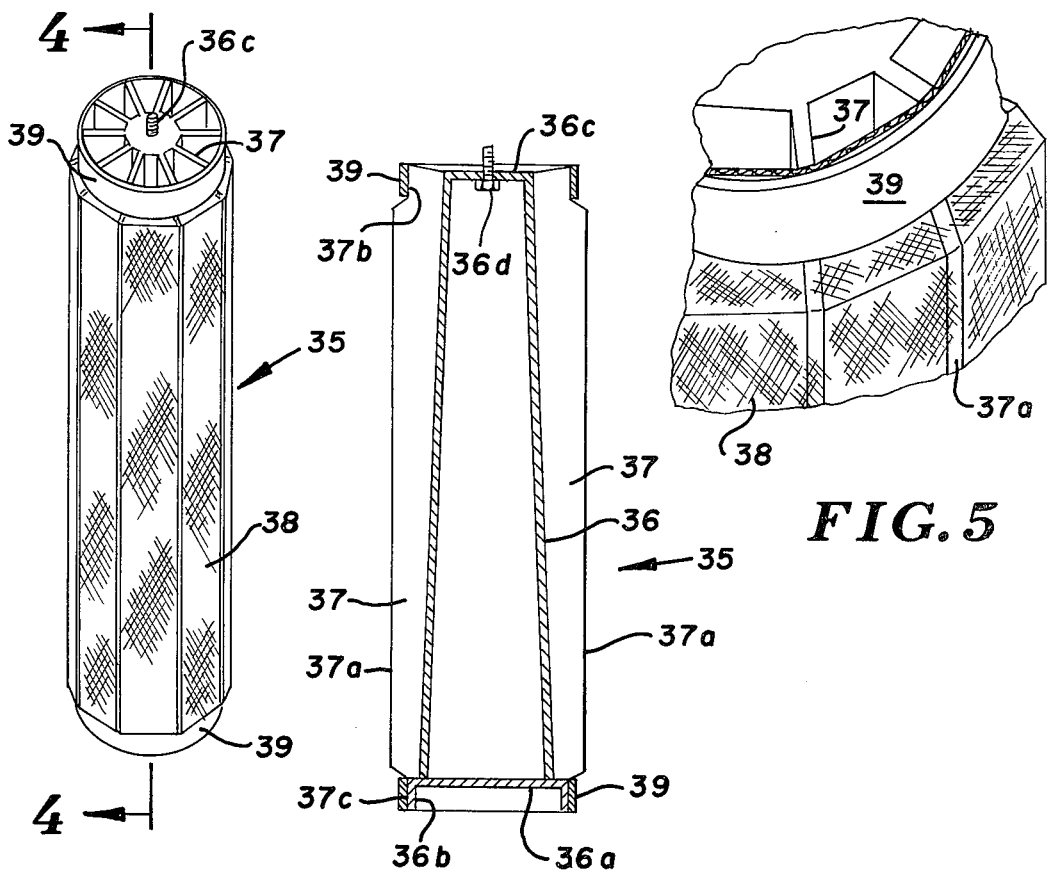
FIG. 3 is a perspective view taken of the filter device.
FIG. 4 is a vertical section taken substantially along line 4—4 of FIG. 3.
FIG. 5 is a partial perspective view illustrating the upper end of the filter device; and, FIG. 6 is a horizontal section taken substantially along line 6—6 of FIG. 2.

Obviously means must be provided for positioning the filter unit 35 within the housing 25. A means for positioning this unit is illustrated in FIG. 2 and such a means may include a first radially extending framed plate member 42 having an opening 42a therein for receiving the attachment member 36d therethrough for attaching such plate to the filter unit 35 and it should be obvious that in order to permit the flow of fluid through this plate 42 that a spider arm supporting configuration may be provided from the center thereof to the periphery 43 thereof. The periphery 43 may be provided with a downwardly extending ring 44 to engage with the retainer 39 on the upper end of the filter element such that the unit will be centered therein and therefore will require no lower support. This plate construction 42 is centered within the housing 25 by providing a sealing ring 45 about the periphery thereof and providing the housing with a locating radially onwardly directed ring 46 to abut with this sealing ring 45. In this manner then, it should be obvious that by releasing the circumferential clamps 26, 29, it will be possible to remove this entire filter unit for changing the filter element 38 if the same is required.

By utilizing the tapered baffle type construction, applicant has found certain advantages. These advantages are particularly true in the back wash of the unit in that a substantially constant pressure differential is maintained along the entire length of the unit for proper back washing of the material collected on the filter media 38 as fluid is directed downwardly through the interior of the filter compartments. Applicant has also found that the utilization of the vane structure properly supports this filter medium against fluid pressure in either a radially inwardly or radially outwardly directed flow.

By providing a plurality of these filter units in a parallel relationship on a framework and within a system, it is possible to remove any of the units or to back wash any of the units without disrupting other filtered service. By utilizing the link 32 to simultaneously control the valves 20, 28, it should be obvious that back washing of the unit will simultaneously occur with the shifting of the valve structures. Obviously for removal of one unit from the system for replacement of the filter element 38 it is essential that there be no fluid available through either one of the inlets. Various means are available to control this situation and the normal operation is to place the valve into back wash position and to control the flow of water through the back wash inlet through other means. By utilizing a multiple filter operation then it should be obvious that one of the filter units can be completely removed and replaced if necessary without disrupting the normal filtering operation.

It should be obvious that applicant has provided a unique filter construction which incorporates a baffling system for maintance of pressure along the longitudinal length of a filter member and which filter member includes a filter device which is normally of a non self supporting material but which when included with the filter element becomes supported for proper filtering of a media passed therethrough and which filter element is easily replaced from not only the system but from the filter device itself.

What I claim is:

1. A filter device including:

a. a longitudinally extending filter housing having an inlet and outlet;
b. means delivering fluid to be filtered to said inlet of said housing;
c. means receiving filtered fluid from said outlet of said housing;
d. a longitudinally extending filter member arranged within said housing, including:
 1. a longitudinally extending, tapered baffle member;
 2. a plurality of radially extending vane members spaced about said baffle and extending longitudinally thereof said vanes and the exterior of said baffle member providing flow channels open at one end and closed at the other end of said baffle;
 3. said other end of said baffle being removably, fluidedly sealed within said housing to permit fluid flow to said fluid receiving means;
 4. a normally non-self-supporting filter element arranged about the radially extending ends of said vanes for support thereof in spaced relation from said baffle, said filter element providing filtering flow therethrough into said flow channels.

2. The structure set forth in claim 1 and the radially extending ends of said vane members being parallel to one another.

3. The structure set forth in claim 2 and the longitudinal ends of said vanes being reduced in radial dimension, said filter element having its ends positioned over said reduced dimension area and retainer means encircling said ends for retaining said filter element about said vanes.

4. The structure set forth in claim 2 and said baffle being multi-sided, said vanes being arranged at the junction of said sides.

* * * * *